United States Patent
Noble et al.

(10) Patent No.: US 8,973,909 B2
(45) Date of Patent: Mar. 10, 2015

(54) CROSS ARM BUSHING ASSEMBLY USEFUL FOR VEHICLE SUSPENSION

(71) Applicant: Hendrickson USA, L.L.C., Itasca, IL (US)

(72) Inventors: Shawn D. Noble, Naperville, IL (US); Matthew J. Van Meter, Plainfield, IL (US)

(73) Assignee: Hendrickson USA, L.L.C., Itasca, IL (US)

( * ) Notice: Subject to any disclaimer, the term of this patent is extended or adjusted under 35 U.S.C. 154(b) by 0 days.

(21) Appl. No.: 13/956,590

(22) Filed: Aug. 1, 2013

(65) Prior Publication Data

US 2015/0035246 A1   Feb. 5, 2015

(51) Int. Cl.
| | | |
|---|---|---|
| *B60G 7/02* | (2006.01) | |
| *F16F 1/38* | (2006.01) | |
| *B60G 3/20* | (2006.01) | |

(52) U.S. Cl.
CPC ................ *B60G 7/02* (2013.01); *F16F 1/3863* (2013.01); *B60G 2204/143* (2013.01); *B60G 3/20* (2013.01)
USPC ........................................................ 267/293

(58) Field of Classification Search
CPC ................ B60G 3/20; B60G 2204/41; B60G 2204/143; B60G 7/02; B60G 2204/4102; F16F 1/3842; F16F 1/3863; F16F 1/3935
USPC .................................................. 267/276, 293
See application file for complete search history.

(56) References Cited

U.S. PATENT DOCUMENTS

| | | | | |
|---|---|---|---|---|
| 1,783,801 A | * | 12/1930 | Leipert | ............................ 267/30 |
| 3,841,771 A | * | 10/1974 | Shankwitz et al. | ........... 403/163 |
| 3,921,734 A | | 11/1975 | Goodfellow | |
| 4,078,276 A | * | 3/1978 | Nunes | .............................. 16/271 |
| 4,619,016 A | | 10/1986 | Brockhaus | |
| 4,652,167 A | * | 3/1987 | Garman | ........................ 403/158 |
| 4,886,407 A | | 12/1989 | Harbin | |
| 5,052,643 A | | 10/1991 | Law | |
| 5,122,011 A | * | 6/1992 | Missig | ........................... 403/226 |
| 5,286,132 A | * | 2/1994 | Morini | ........................... 403/228 |

(Continued)

FOREIGN PATENT DOCUMENTS

| | | |
|---|---|---|
| EP | 0520935 | 3/1995 |
| JP | 2003-154966 | 5/2003 |

(Continued)

OTHER PUBLICATIONS

International Searching Authority, International Search Report and Written Opinion for PCT/US2014/048541 mailed Oct. 28, 2014, 12 pages.

*Primary Examiner* — Paul N Dickson
*Assistant Examiner* — Timothy Wilhelm
(74) *Attorney, Agent, or Firm* — McDonnell Boehnen Hulbert & Berghoff LLP (57) ABSTRACT

A cross arm bushing assembly for use in a vehicle suspension is provided having a bushing with an outer surface adapted for rotation with respect to an end of a control arm, a cross arm assembly positioned within the bushing that includes a cross arm having a first end and a second end, and a front side and a back side, the first end of the cross arm having a first opening for receiving a first connecting rod, and the second end of the cross arm having a second opening for receiving a second connecting rod, a first connecting rod extending into the first opening of the cross arm, and a second connecting rod extending into the second opening of the cross arm.

23 Claims, 5 Drawing Sheets

(56) References Cited

U.S. PATENT DOCUMENTS

| | | | |
|---|---|---|---|
| 5,820,156 A | 10/1998 | VanDenberg | |
| 5,826,896 A * | 10/1998 | Baumann | 280/124.171 |
| 5,988,614 A * | 11/1999 | Sturmon | 267/292 |
| 6,202,994 B1 * | 3/2001 | Spurlin | 267/136 |
| 6,267,680 B1 * | 7/2001 | Girard et al. | 464/89 |
| 6,430,774 B1 * | 8/2002 | McLaughlin et al. | 16/2.1 |
| 6,457,923 B1 | 10/2002 | Grossman | |
| 6,863,289 B2 * | 3/2005 | Buhl et al. | 280/124.111 |
| 7,063,310 B2 * | 6/2006 | Power et al. | 267/140.12 |
| 7,090,208 B1 * | 8/2006 | Kiddle | 267/293 |
| 7,165,909 B2 * | 1/2007 | Buhl et al. | 403/132 |
| 7,513,517 B2 * | 4/2009 | Barton et al. | 280/124.116 |
| 7,805,808 B2 | 10/2010 | Matteson | |
| 7,883,097 B1 * | 2/2011 | Johnston et al. | 280/124.107 |
| 8,037,573 B2 * | 10/2011 | Bost, Jr. | 16/2.2 |
| 8,192,106 B2 * | 6/2012 | Vogler et al. | 403/372 |
| 8,226,100 B2 * | 7/2012 | Rodecker et al. | 280/124.166 |
| 8,434,749 B2 * | 5/2013 | Rogge et al. | 267/293 |
| 8,579,510 B2 * | 11/2013 | Noble et al. | 384/428 |
| 8,783,993 B2 * | 7/2014 | Brunneke et al. | 403/133 |
| 2002/0048485 A1 * | 4/2002 | Garnier et al. | 403/135 |
| 2003/0201589 A1 | 10/2003 | Adema et al. | |
| 2003/0227117 A1 * | 12/2003 | McCarthy | 267/270 |
| 2004/0084822 A1 | 5/2004 | Collyer et al. | |
| 2006/0163788 A1 * | 7/2006 | Kiddle | 267/293 |
| 2006/0180967 A1 * | 8/2006 | Adema et al. | 267/280 |
| 2008/0230676 A1 * | 9/2008 | Hansemann et al. | 248/634 |
| 2009/0060640 A1 | 3/2009 | Vogler et al. | |
| 2009/0249581 A1 | 10/2009 | Bost, Jr. | |
| 2011/0108668 A1 | 5/2011 | Benthien | |
| 2011/0116731 A1 * | 5/2011 | McLaughlin | 384/153 |
| 2011/0222803 A1 | 9/2011 | Noble et al. | |
| 2012/0175831 A1 * | 7/2012 | Kieffer | 267/292 |
| 2012/0326368 A1 * | 12/2012 | Makino et al. | 267/141.3 |
| 2013/0043719 A1 | 2/2013 | Wietharn et al. | |

FOREIGN PATENT DOCUMENTS

| | | |
|---|---|---|
| JP | 2012-131325 | 7/2012 |
| WO | 01/40001 | 6/2001 |

* cited by examiner

FIG. 7

CROSS ARM BUSHING ASSEMBLY USEFUL FOR VEHICLE SUSPENSION

BACKGROUND

The present application generally relates to innovations and improvements in the components used in vehicle systems, such as a vehicle suspension. More particularly, the present application relates to a bushing assembly useful for connecting components of a vehicle suspension.

Bar pin bushing assemblies for use in vehicular systems, such as suspensions, are known. Such assemblies are commonly used to connect different components of a vehicular system, such as beams, brackets, arms, clamps, frames, rails, rods, and other like components. Existing bar pin bushing assemblies consist of a bar pin that be made formed of a cylindrical piece of solid metal such as steel bar, steel forging, cast iron, or wrought or cast aluminum fixedly positioned and non-rotatable within one or more outer bushing components. For example, a bushing elastomer may be mold-bonded, post-bonded, or not bonded to the bar pin. Existing bar pin bushing assemblies may include a first end and a second end that extend from the bushing of the bar pin bushing assembly, where the first end and second end each have a bore or hole for receiving a fastener which could be used to connect the bar pin to a separate and different component of a vehicle suspension.

The overall weight of a vehicle may be an important design consideration, and in certain applications it is desired to make the vehicle suspension as light as possible, while still maintaining desired strength, stability, and performance characteristics. Existing bar pin bushing assemblies that are made of a solid piece of cylindrical metal may be relatively heavy. Furthermore, such bar pin bushing assemblies require a number of attachment bolts and washers to attach the ends of the bar pin to another vehicle component. The attachment bolts and washers may add weight and additional parts to the vehicle suspension that may result in increased material, manufacturing, and shipping costs. Furthermore, the bar pin bushing assemblies may be difficult to properly align when attaching them to other vehicle components, causing the bushing to become unnecessarily preloaded when aligning and drawing the bar pin bushing into alignment.

In addition, in order to tighten the nut onto the bolt that has been inserted through the hole on the end of the bar pin, a reaction wrench is needed to hold the nut in place while the bolt is screwed into the nut. Often the location of the bar pin bushing within a vehicle suspension is difficult to access, which may result in difficulties assembling the suspension, and may provide even greater difficulties when servicing and/or replacing components of the vehicle suspension in the field, particularly if a reaction wrench is required to loosen the bolt.

Furthermore, although bonding an elastomer to as-forged or as-cast surfaces of prior bar pin designs is possible, the interface between the as-forged or as-cast surfaces does not produce the same strength as bonding the bushing elastomer to a machined surface or a wrought (hot rolled or cold drawn) surface.

In theory, each end of the outer metal of the bushing could be captured with a U-shaped bolt. However, the use of U-shaped bolts would require a nut for each end of the U-shaped bolt, resulting in two U-shaped bolts and four nuts and perhaps four washers required to attach the bushing to another vehicle component. Thus, a configuration utilizing two U-shaped bolts disadvantageously requires two relatively heavy U-shaped bolts, as compared to a straight bolt, as well as four nuts, and perhaps four washers adding weight and components to the suspension which may not be desired. Moreover, uniformly tightening both sides of a U-shaped bolt may add another level of undesirable complexity.

In view of the conditions identified above with respect to prior bar pin bushing assemblies for vehicle suspensions, and the disadvantages of using U-shaped bolts to connect suspension components, it is desirable to provide a new and improved bushing assembly for connecting components of a vehicle suspension. In particular, it is desirable to provide a bushing assembly that has a lighter weight, has fewer parts, is less costly, is easier to manufacture, and/or is easier to assemble or disassemble than prior designs.

SUMMARY

In one aspect, a cross arm bushing assembly for use in a vehicle suspension is provided having a bushing with an outer surface adapted for rotation with respect to an end of a control arm, a cross arm assembly positioned within the bushing that includes a cross arm having a first end and a second end, and a front side and a back side, the first end of the cross arm having a first opening for receiving a first connecting rod, and the second end of the cross arm having a second opening for receiving a second connecting rod, a first connecting rod extending into the first opening of the cross arm, and a second connecting rod extending into the second opening of the cross arm.

The cross arm bushing assembly may optionally be configured so that the first opening of the cross arm is threaded for receiving a threaded end of the first connecting rod, and the second opening of the cross arm is threaded for receiving a threaded end of the second connecting rod. The cross arm bushing assembly may also be optionally configured so that the first opening extends through the cross arm, and a nut recess is positioned about the first opening on the back side of the cross arm, and the second opening extends through the cross arm, and a nut recess is positioned about the second opening on the back side of the cross arm.

In addition, the cross arm bushing assembly may further be optionally configured so that the front side of the cross arm includes a first bushing engaging surface positioned beneath the first and second openings, and a second bushing engaging surface positioned above the first and second openings.

In a further aspect, a subassembly of a vehicle suspension is provided having a frame hanger, a first control arm, and a first cross arm bushing assembly positioned between an end of the first control arm and the frame hanger, the first cross arm bushing assembly having a first bushing having an outer surface adapted for rotation with respect to the end of the first control arm, a first cross arm assembly positioned within the bushing, the cross arm assembly having a first cross arm having a first end and a second end, and a front side and a back side, the first end of the first cross arm having a first opening for receiving a first connecting rod, and the second end of the first cross arm having a second opening for receiving a second connecting rod, a first connecting rod extending through a first opening in the frame hanger and into the first opening of the first cross arm, and a second connecting rod extending through a second opening in the frame hanger and into the second opening of the first cross arm.

BRIEF DESCRIPTION OF THE DRAWINGS

Exemplary embodiments of the invention are described herein with reference to the drawings, wherein like parts are designated by like reference numerals, and wherein.

DETAILED DESCRIPTION

Figure 1:
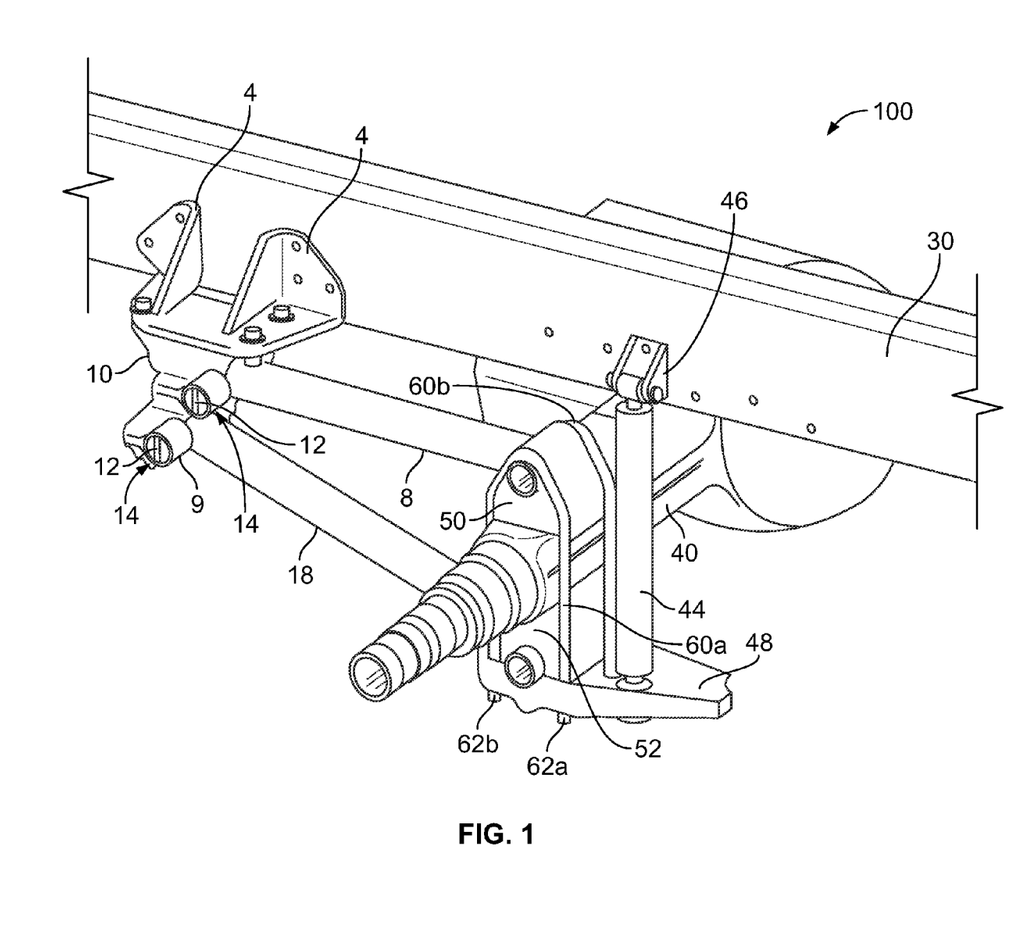
FIG. 1 is a perspective view of a suspension assembly 100 shown attached to a vehicle frame rail 30.

FIG. 1 is a perspective view of a suspension 100 shown attached to a vehicle frame rail 30. In particular, suspension 100 is shown with two frame brackets 4 attached to frame rail 30. Each frame bracket 4 is also attached to an upper surface of frame hanger 10. A cross arm bushing assembly 14 having a bushing 9 is used to attach upper control arm 8 to frame hanger 10, and a separate cross arm bushing assembly 14 is also used to attach lower control arm 18 to frame hanger 10. An opposite end of upper control arm 8 is shown attached to upper axle attachment member 50 of axle 40, and an opposite end of lower control arm 18 is shown attached to lower axle attachment member 52 of axle 40. It will be appreciated that suspension 100, and the components used therein, are exemplary, and that the cross arm bushing assembly 14 could be used in a wide variety of applications, including use in vehicle suspension assemblies having a different configuration and/or components than those that are shown in FIG. 1. Thus, for example, cross arm bushing assembly 14 could be used to attach a wide variety of vehicle components together, including beams, brackets, arms, clamps, frames, rails, rods, and other like components. In addition, as used herein, the term "control arm" is to be broadly construed and includes any member that is used to connect one vehicle component to another vehicle component.

In addition, frame brackets 4 and frame hanger 10 are also exemplary, as frame brackets 4 could be a single bracket and/or have a different configuration, and frame hanger 10 could also have a different configuration. For example, frame hanger 10 and frame brackets 4 could be configured as a single integral bracket or frame hanger. It should be understood that the term "vehicle" is used broadly herein to encompass all kinds of vehicles, including, but not limited to, all forms of cars, trucks, buses, recreational vehicles (RVs), motorcycles, etc., whether or not they include an engine. Moreover, for purposes of this description, unless specifically described otherwise, the term "vehicle" herein refers to a vehicle or a trailer. In this way, for example, a vehicle suspension system refers to a vehicle suspension or a trailer suspension.

Figure 2:
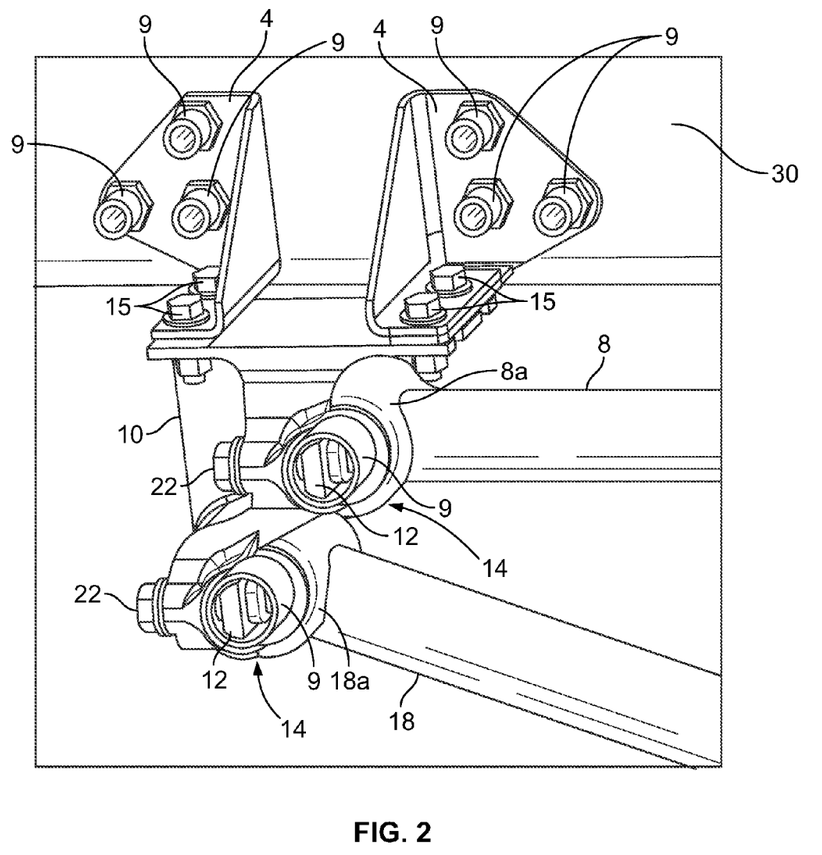
FIG. 2 is a close up perspective view of the left side of suspension 100 shown in FIG. 1.

FIG. 2 is a close up perspective view of the left side of suspension 100 shown in FIG. 1. Frame brackets 4 are shown attached to vehicle frame rail 30 with a plurality of bolts 9. The frame hanger 10 is also attached to frame brackets 4 using bolts 15. A first cross arm bushing assembly 14 having bushing 9 is shown connecting frame hanger 10 to upper control arm 8 using connecting rods 22. In addition, a second cross arm bushing assembly 14 having a bushing 9 is shown connecting frame hanger 10 to lower control arm 18 using connecting rods 22.

Figure 3A:
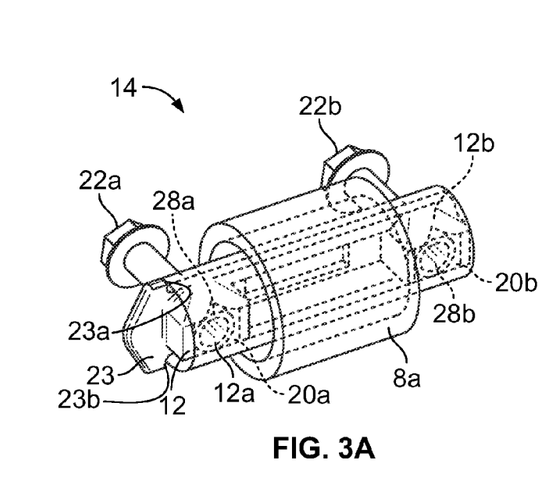
FIG. 3A is a perspective rear view of a cross arm bushing assembly 14 used to connect frame hanger 10 to upper control arm 8 and lower control arm 18 shown in FIGS. 1 and 2.
Figure 3B:
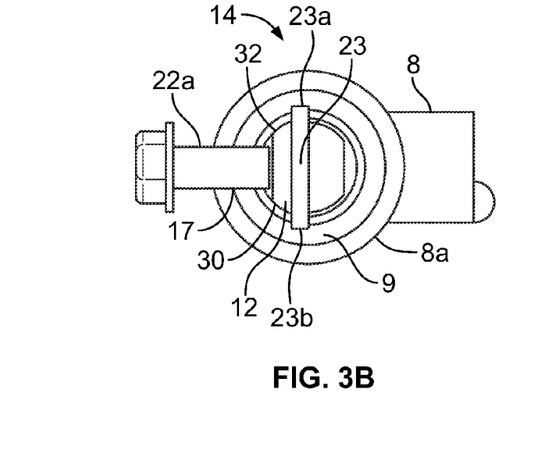
FIG. 3B is a side view of the cross arm bushing assembly 14 shown in FIG. 3A.

FIG. 3A is a perspective back view of cross arm bushing assembly 14 shown in FIGS. 1 and 2, positioned within an end 8a of upper control arm 8. FIG. 3B is a side view of the cross arm bushing assembly 14 shown in FIG. 3A. FIGS. 3A and 3B show the inventive cross arm bushing assembly 14 that includes a cross arm 12 positioned within bushing 9 within end 8a of control arm 8.

In this embodiment, two connecting rods 22a and 22b extend through the cross arm 12 where they are threaded into two respective nuts 28a and 28b positioned within nut recesses 20a and 20b located on the back side of the cross arm 12. Connecting rods 22a and 22b are shown as bolts or screws that extend through an opening or slot 17 in bushing 9 as best shown in FIG. 3B. As used herein, the term "connecting rod" is to be broadly construed and includes any connector, such as a bolt, screw, pin, or other fastener, threaded or unthreaded, that can be used to secure different parts together. Moreover, the "connecting rod" may have a cross-section that is round, square, hexagonal, or any other suitable geometric shape. The cross arm 12 may include an alignment tab 23 extending from a first end 12a of cross arm 12. The alignment tab 23 allows for proper alignment of the holes 27a and 27b of cross arm 12 (See FIG. 4B) with the opening or slot 17 in bushing 9, so that the connecting rods 22a and 22b may pass through opening 17 in the bushing 9 and into the holes 27a and 27b in cross arm 12.

In addition, the alignment tab 23 may have shoulder 23a and/or shoulder 23b that extend from the alignment tab 23 and extend beyond the inner diameter of bushing 9. The shoulders 23a and 23b extend beyond the inner diameter of bushing 9 so that when the cross arm 12 is positioned within the bushing 9, the shoulders 23a and 23b abut the end of the bushing 9 to insure the cross arm is positioned at the proper distance within the bushing 9 so that the opening or slot 17 in the bushing 9 may be aligned with the holes 27a and 27b in cross arm 12.

After the bushing 9 is positioned within end 8a of control arm 8, the cross arm 12 may advantageously rotate within bushing 9, and may also move axially within bushing 9 before the connecting rods 22a and 22b are tightened onto the nuts 28a and 28b. The connecting rods 22a and 22b may be M20 bolts and the bushing 9 may be comprised of metal. The ability of cross arm 12 to rotate and move axially within bushing 9 may provide significant advantages in terms of ease of assembly. For example, although bushing 9 is designed to rotate within end 8a of control arm 8, because of various forces acting on the suspension, the bushing 9 may be difficult to rotate within end 8a. Therefore, prior art bar pin bushings where the bar pin was not free to rotate within the bushing presented more challenges when attempting to properly align the holes or bores of the bar pin because rotational movement of the bar pin required rotational movement of the bushing within an end of a control arm. Axial movement of the bar pin for alignment purposes also presented difficulties because axial movement of the bar pin required axial movement of the bushing within an end of a control arm which could be difficult. Consequently, the ability of the cross arm 12 to easily rotate within bushing 9 and readily move axially within bushing 9 prior to tightening the connecting rods 22a and 22b onto the nuts 28a and 28b provides significant advantages.

Moreover, because the cross arm 12 may easily rotate within bushing 9 prior to installation, nuts 28a and 28b may be placed into nut recesses 20a and 20b on the back side of cross arm 12. The cross arm 12 may be positioned beneath the nuts 28a and 28b within the recesses 20a and 20b and inserted into bushing 9. Once the cross arm 12 is inserted into the bushing 9, the nuts 28a and 28b cannot fall out of the nut recesses 20a and 20b because the bushing 9 extends axially from the first end 12a of cross arm 12 to a second end 12b of cross arm 12 covering the nut recesses 20a and 20b and preventing the nuts 28a and 28b from escaping the nut recesses 20a and 20b. As best seen in FIG. 3B, the inner diameter of bushing 9 is positioned near the nut recesses 20a and 20b such that the nuts 28a and 28b are captured between the bushing 9 and the nut recesses 20a and 20b and cannot fall out.

After the cross arm 12 with nuts 28a and 28b positioned in the nut recesses 20a and 20b is inserted into the bushing 9, an installer may grasp the alignment tab 23 and rotate the cross arm 12 to align the holes 27a and 27b in the cross arm 12 with the opening or slot 17 in the bushing 9. Of course, the shoulders 23a and 23b of alignment tab 23 insure that the cross arm is inserted to a proper depth within the bushing 9 for proper alignment of holes 27a and 27b with the opening or slot 17 in bushing 9.

Figure 4A:
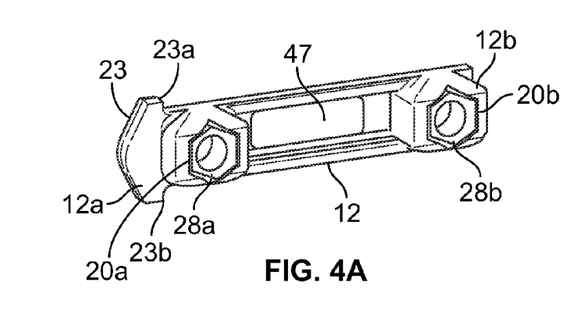
FIG. 4A is a perspective rear view of cross arm 12 used in the cross arm bushing assembly 14 shown in FIGS. 3A and 3B.
Figure 4B:
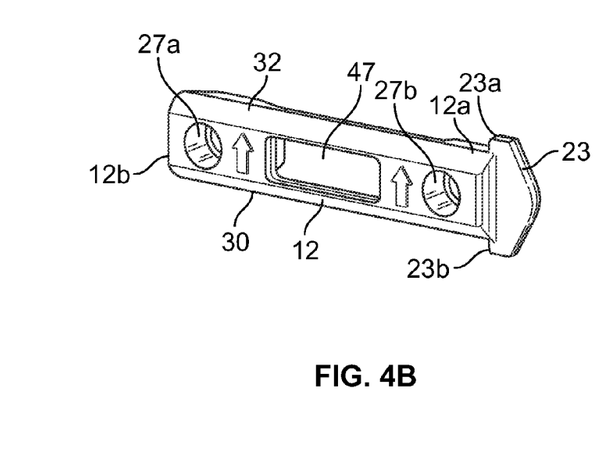
FIG. 4B is a perspective front view of cross arm 12 used in the cross arm bushing assembly 14 shown in FIGS. 3A and 3B.

FIGS. 4A and 4B disclose the cross arm 12 shown in FIGS. 1, 2, 3A, and 3B. FIG. 4A is a perspective back view of the cross arm 12. Nuts 28a and 28b are shown positioned with nut recesses 20a and 20b located on first end 12a and second end 12b of cross arm 12. FIG. 4B is a perspective front view of the cross arm 12 showings holes 27a and 27b positioned on first end 12a and second end 12b of cross arm 12.

A further advantage of cross arm 12 is the use of nut recesses 20a and 20b, which are sized such that when connecting rods 22a and 22b are threaded into nuts 28a and 28b positioned in the nut recesses 20a and 20b, the nuts 28a and 28b are prevented from freely rotating within the nut recesses 20a and 20b. Consequently, the need for a reaction wrench to hold the nuts 28a and 28b in place while the connecting rods 22a and 22b are being threaded into the nuts 28a and 28b is eliminated. This design provides for greater ease of manufacture and assembly. Similarly, a reaction wrench is also not needed for disassembly, resulting in greater ease of repair and service.

In addition, as shown in FIGS. 4A and 4B, the design of cross arm 12 allows it to be easily manufactured. For example, cross arm 12 could be a cast piece that does not require any machining. In a preferred embodiment, the cross arm 12 may be made of a ductile iron casting. Furthermore, cross arm 12 may be much lighter than a solid cylindrical bar pin, because it may have a much smaller cross-sectional area in general because it does not have to be a solid cylinder. Moreover, it may include one or more holes, such as aperture 47, eliminating material from the design, and reducing the weight and material (and cost of material) required.

Additionally, the design of the cross arm bushing assembly facilitates in-mold bonding of the elastomer to a machined or wrought (hot rolled or cold drawn) surface of the bushing 9 for high bond strength, in comparison to the bond strength when bushing elastomer is molded to an as-forged or as-cast surface of a bar pin. The high bond strength helps to reduce bushing walk (axially about the inner metal). Bushings are typically most sensitive to walk on the inner metal surface since the elastomer strains are highest there. The cross arm 12 disclosed herein can also be made of a lighter material, e.g., cast iron, that may be sculpted to remove unnecessary material to further reduce weight. Thus, weight and cost benefits are provided without any sacrifice in performance from a machined, in-mold bonded, bushing.

In addition, the design of the cross arm bushing assembly 14 described above may be superior to using a pair of U-shaped bolts to secure the ends of the bushing 9 to the frame hanger 10, because two nuts and perhaps two or more washers are generally required for each U-shaped bolt that is used. The design shown in FIGS. 1-4B uses two connecting rods and two nuts, instead of two U-shaped bolts and 4 nuts that would be required when using U-shaped bolts. In fact, in FIG. 1, a first U-shaped bolt 60a is shown securing a bushing within upper control arm 8 against upper axle attachment member 50 with two nuts 62 securing the end of the first U-shaped bolt 60a to spring mount 48. A second U-shaped bolt 60b is also used to secure the bushing within upper control arm 8 against upper axle attachment member 50 with two bolts (not shown) securing the end of the second U-shaped bolt 60b to spring mount 48. Thus it can be seen that when using two U-shaped bolts, such as bolts 60a and 60b, four nuts are required, where only two nuts are required when using the cross arm bushing assembly 14 shown in FIGS. 1-4. It will be appreciated, however, that in some embodiments a cross arm bushing assembly could be used in place of U-shaped bolts to secure the control arms to upper and lower axle attachment members 50 and 52.

Additionally, cross arm bushing assembly 14 provides additional advantages as well. In particular, as best seen in FIGS. 3B and 4B, cross arm 12 includes a first bushing engaging surface 30 positioned beneath the connecting rods 22a and 22b and holes 27a and 27b (when viewed from the side) that extends axially along the outer surface of cross arm 12, as well as a second bushing engaging surface 32 positioned above the connecting rods 22a and 22b and holes 27a and 27b (when viewed from the side) that extends axially along the outer surface of cross arm 12. The use of two bushing engaging surfaces 30 and 32 provides two contacting surfaces that serve to reduce stress on the threaded interface between the connecting rods 22a and 22b and threaded nuts 28a and 28b, by distributing force along the contacting surfaces 30 and 32.

Bushing engaging surfaces 30 and 32 may be formed by providing a flat between two concentric radial arcs that are complementary to the inner surface of bushing 9. This design ensures that the reaction load of the nuts 28a and 28b does not become centralized around the threads and holes 27a and 27b in the cross arm 12, which could lead to reduced clamp capacity and fatigue life. Rather, the reaction load is distributed into two zones where the bushing engaging surfaces 30 and 32 engage the inner surface of bushing 9 away from the threads and connecting rod clearance holes 27a and 27b in the cross arm 12.

Figure 5:
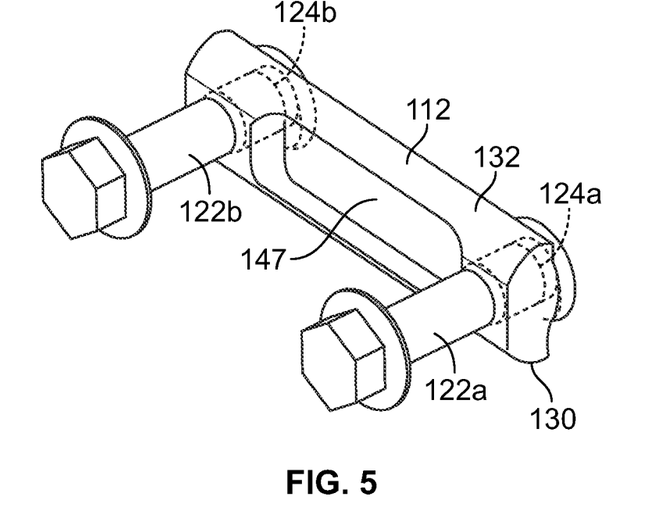
FIG. 5 is a perspective front view of cross arm 112 that may be used in the cross arm bushing assembly 14 shown in FIGS. 3A and 3B.
Figure 6:
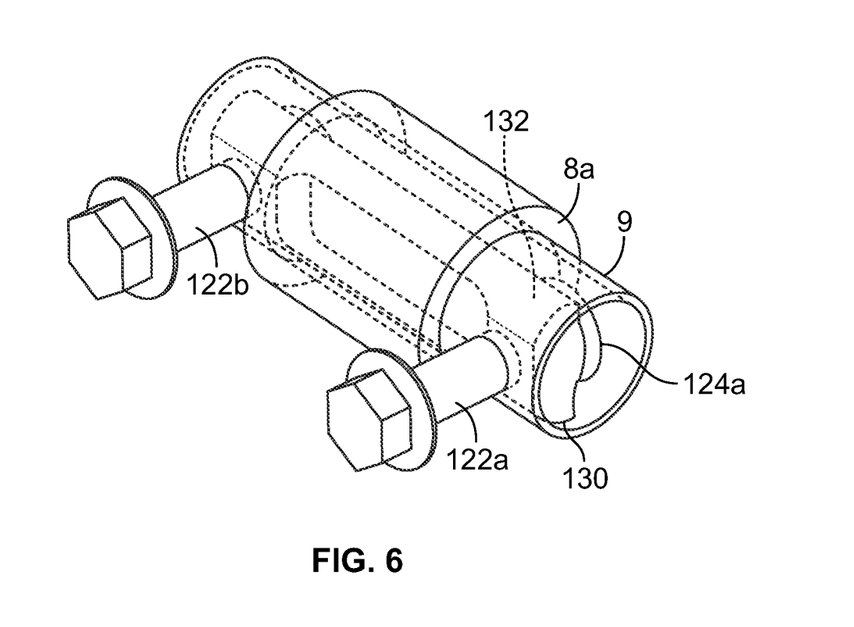
FIG. 6 is a perspective rear view of the cross arm 112 shown in FIG. 5 positioned in bushing 9 and end 8a of control arm 8.

FIG. 5 is a perspective front view of cross arm 112 that may be used in the cross arm bushing assembly 14 shown in FIGS. 3A and 3B. FIG. 6 is a perspective rear view of the cross arm 112 shown in FIG. 5 positioned within bushing 9 and end 8a of cross arm 8. Cross arm 112 is similar in many respects to cross arm 12 shown in FIGS. 1-4B. However cross arm 112 includes tapped holes 124a and 124b that threaded connecting rods 122a and 122b are threaded into. With this design, the need for any nuts is eliminated. As a result, even fewer components may be required which may provide for a lighter and more cost effective design. In addition, a recess 147 may be positioned in the cross arm 112 to reduce the amount of material used in the cross arm 112, further reducing the weight and cost of the design.

The bushing 9 shown in FIG. 6 may be the same as that shown in FIGS. 1-4B. In addition, cross arm 112 includes a first bushing engaging surface 130 positioned beneath the connecting rods 122a and 122b and tapped holes 124a and 124b (when viewed from the side) that extends axially along the outer surface of cross arm 112, as well as a second rounded bushing engaging surface 32 positioned above the connecting rods 122a and 122b and tapped holes 124a and 124b (when viewed from the side) that extends axially along the outer surface of cross arm 112, just like the cross arm 12. The use of two bushing engaging surfaces 130 and 132 provides two contacting surfaces that serve to reduce stress on the threaded interface between the connecting rods 122a and 122b and threads of tapped holes 124a and 124b, by distributing force along the contacting surfaces. The use of first bushing engaging surfaces 130 and 132 provides the same advantages noted above in the description of FIGS. 1-4B. Although not shown in FIGS. 5 and 6, the cross arm 112 may further include an alignment tab 23 and one or more of the shoulders 23a and 23b as shown in FIGS. 3A, 3B, 4A, and 4B, if desired.

Figure 7:
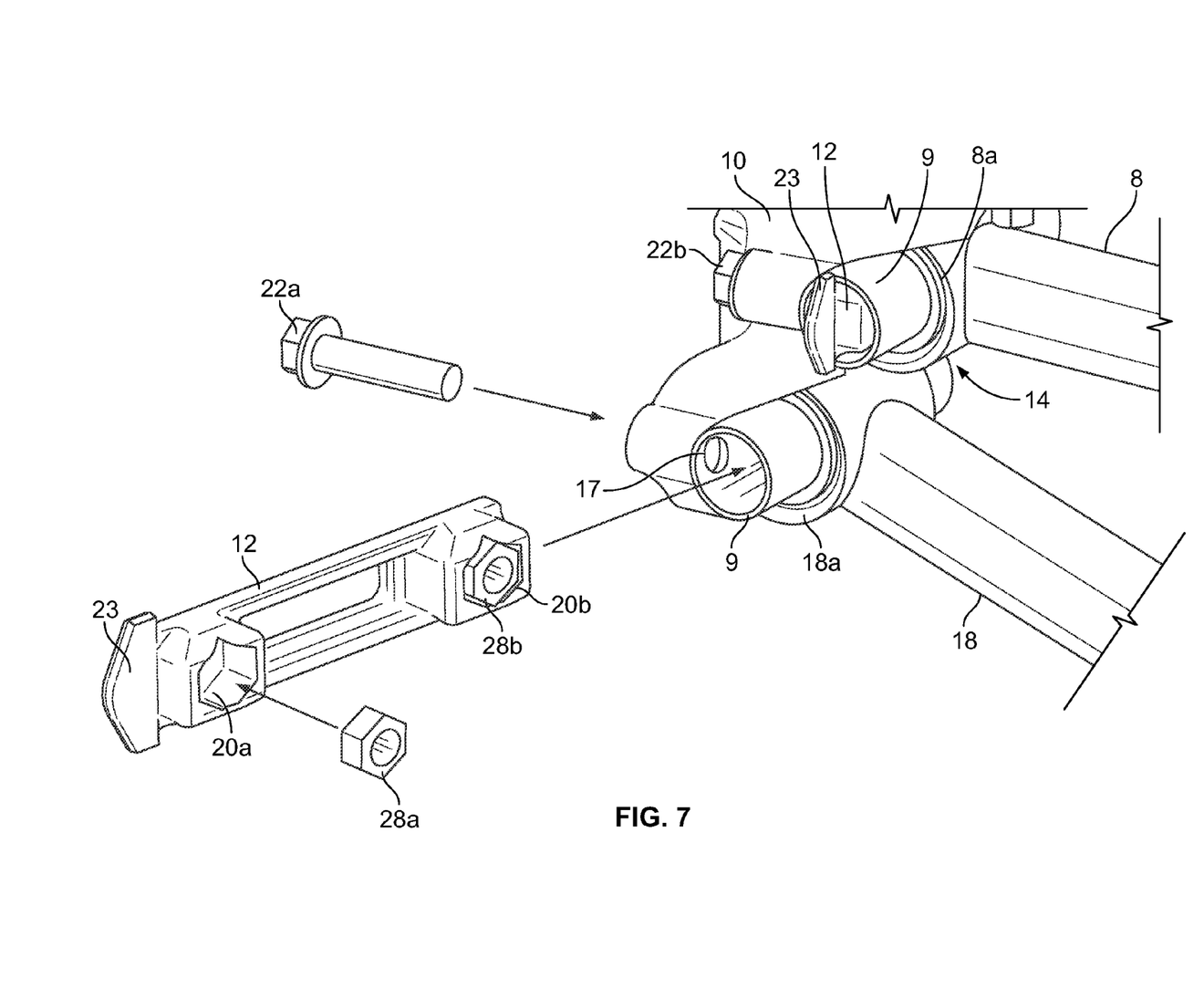
FIG. 7 is an exploded perspective view of the connection of upper and lower control arms 8 and 18 to the frame hanger 10 using the cross arm bushing assembly 14.

FIG. 7 is an exploded perspective view of the connection of upper control arm 8 and lower control arm 18 to the frame hanger 10. In particular, with respect to upper control arm 8, a cross arm bushing assembly 14 is shown securing bushing 9 of cross arm bushing assembly 14 to frame hanger 10 using connecting rod 22b which is inserted through a hole or slot in bushing 9 and secured to cross arm 12 within bushing 9. Bushing 9 is secured within bushing housing 8a at the end of upper control arm 8.

With respect to lower control arm 18, cross arm 12 is shown prior to its insertion into bushing 9. Nuts 28a and 28b are shown for positioning within nut recesses 20a and 20b of cross arm 12. Once cross arm 12 and nuts 28a and 28b are inserted into bushing 9, connecting rods 22a and 22b may be inserted through openings or slots 17 in bushing 9, and threaded into nuts 28a and 28b to secure the cross arm 12 within bushing 9, and thereby securing bushing 9 to frame hanger 10. Bushing 9 is secured within bushing housing 18a at the end of lower control arm 18. Thus, a cross arm bushing assembly 14 is used to attach upper control arm 8 to frame hanger 10, and a cross arm bushing assembly 14 is also used to attach lower control arm 18 to frame hanger 10.

Example embodiments have been described above. Those skilled in the art will understand that changes and modifications may be made to the described embodiments without departing from the true scope and spirit of the present invention, which is defined by the claims.

We claim:

1. A cross arm bushing assembly for use in a vehicle suspension comprising:
    a bushing having an outer surface adapted for rotation with respect to an end of a control arm;
    a cross arm assembly positionable within the bushing, the cross arm assembly comprising:
        a cross arm having a first end and a second end, and a front side and a back side, the first end of the cross arm having a first opening for receiving a first connecting rod, and the second end of the cross arm having a second opening for receiving a second connecting rod;
        a first connecting rod extendable into the first opening of the cross arm;
        a second connecting rod extendable into the second opening of the cross arm; and
    wherein the bushing includes a first slot or hole to allow the first connecting rod to pass through and into the first opening in the cross arm.

2. The cross arm bushing assembly of claim 1, wherein the first opening of the cross arm is threaded for receiving a threaded end of the first connecting rod, and the second opening of the cross arm is threaded for receiving a threaded end of the second connecting rod.

3. The cross arm bushing assembly of claim 1, wherein the first opening extends through the cross arm, and a first nut recess is positioned about the first opening on the back side of the cross arm, and the second opening extends through the cross arm, and a second nut recess is positioned about the second opening on the back side of the cross arm.

4. The cross arm bushing assembly of claim 3, wherein when the cross arm is positioned within the bushing, the bushing has a length such that the bushing extends far enough so that at least a portion of the nut recesses are positioned within the interior of the bushing.

5. The cross arm bushing assembly of claim 4, wherein when first and second nuts are positioned within the nut recesses, they are captured within the nut recesses by the bushing.

6. The cross arm bushing assembly of claim 3, wherein the nut recesses are sized so that a nut is prevented from freely rotating when the connecting rods are threaded into the nuts.

7. The cross arm bushing assembly of claim 1, wherein the bushing further includes a second slot or hole to allow the second connecting rod to pass through and into the second opening in the cross arm.

8. The cross arm bushing assembly of claim 1, wherein the cross arm is comprised of a single cast piece of ductile iron.

9. The cross arm bushing assembly of claim 8, wherein the cross arm is formed with no machining steps.

10. The cross arm bushing assembly of claim 1, wherein an alignment tab extends from the first end of the cross arm.

11. The cross arm bushing assembly of claim 10, further including a shoulder extending outwardly from the alignment tab that extends beyond an inner diameter of the bushing.

12. The cross arm bushing assembly of claim 1, wherein one or more holes are positioned between the first opening and second opening of the cross arm.

13. The cross arm bushing assembly of claim 1, wherein one or more recesses are positioned between the first opening and the second opening of the cross arm.

14. The cross arm bushing assembly of claim 1, wherein the front side of the cross arm includes a first bushing engaging surface positioned beneath the first and second openings, and a second bushing engaging surface positioned above the first and second openings.

15. The cross arm bushing assembly of claim 14, wherein the first bushing engaging surface extends continually from the first opening to the second opening.

16. The cross arm bushing assembly of claim 15, wherein the second bushing engaging surface extends continually from the first opening to the second opening.

17. The cross arm bushing assembly of claim 14, wherein the first bushing engaging surface is a radial arc that is complementary to an inner surface of the bushing.

18. The cross arm bushing assembly of claim 17, wherein the second bushing engaging surface is a radial arc that is complementary to the inner surface of the bushing.

19. The cross arm bushing assembly of claim 1, wherein a threaded end of the first connecting rod is positioned within the bushing, and wherein a threaded end of the second connecting rod is positioned within the bushing.

20. A subassembly of a vehicle suspension comprising:
a frame hanger;
a first control arm; and
a first cross arm bushing assembly positionable between an end of the first control arm and the frame hanger, the first cross arm bushing assembly comprising:
- a first bushing having an outer surface adapted for rotation with respect to the end of the first control arm;
- a first cross arm assembly positionable within the bushing, the cross arm assembly comprising:
  - a first cross arm having a first end and a second end, and a front side and a back side, the first end of the first cross arm having a first opening for receiving a first connecting rod, and the second end of the first cross arm having a second opening for receiving a second connecting rod;
  - a first connecting rod extendable through a first opening in the frame hanger and into the first opening of the first cross arm;
  - a second connecting rod extendable through a second opening in the frame hanger and into the second opening of the first cross arm; and
- wherein prior to tightening of the first and second connecting rods, the cross arm is able to rotate within the bushing; and
- wherein the first bushing includes a first slot or hole to allow the first connecting rod to pass through and into the first opening in the first cross arm.

21. The subassembly of a vehicle suspension of claim 20 further comprising:
a second control arm; and
a second cross arm bushing assembly positionable between an end of the second control arm and the frame hanger, the second cross arm bushing assembly comprising:
- a second bushing having an outer surface adapted for rotation with respect to the end of the second control arm;
- a second cross arm assembly positionable within the second bushing, the second cross arm assembly comprising:
  - a second cross arm having a first end and a second end, and a front side and a back side, the first end of the second cross arm having a first opening for receiving a third connecting rod, and the second end of the second cross arm having a second opening for receiving a fourth connecting rod;
- a third connecting rod extendable through a third opening in the frame hanger and into the first opening of the second cross arm;
- a fourth connecting rod extendable through a fourth opening in the frame hanger and into the second opening of the second cross arm;
wherein prior to tightening of the third and fourth connecting rods, the second cross arm is able to rotate within the second bushing; and
wherein the second bushing includes a first slot or hole to allow the third connecting rod to pass through and into the first opening in the second cross arm.

22. A cross arm bushing assembly for use in a vehicle suspension comprising:
a bushing having an outer surface adapted for rotation with respect to an end of a control arm;
a cross arm assembly positionable within the bushing, the cross arm assembly comprising:
- a cross arm having a first end and a second end, and a front side and a back side, the first end of the cross arm having a first opening for receiving a first connecting rod, and the second end of the cross arm having a second opening for receiving a second connecting rod;
- a first connecting rod extendable into the first opening of the cross arm;
- a second connecting rod extendable into the second opening of the cross arm;
wherein prior to tightening of the first and second connecting rods, the cross arm is able to rotate within the bushing, and to move axially within the bushing; and
wherein the bushing includes a first slot or hole to allow the first connecting rod to pass through and into the first opening in the cross arm.

23. The cross arm bushing assembly of claim 22, wherein when the first and second connecting rods are tightened, the cross arm is in bearing engagement with the bushing.

* * * * *